3,576,870
PROCESS FOR PURIFYING N,N-DIMETHYLACETAMIDE

Emmette F. Izard, Springville, N.Y., assignor to E. I. du Pont de Nemours and Company, Wilmington, Del.
No Drawing. Filed July 5, 1967, Ser. No. 651,146
Int. Cl. C07c 103/34
U.S. Cl. 260—561                3 Claims

ABSTRACT OF THE DISCLOSURE

Purifying dimethylacetamide by removing acetic anhydride with a basic ion exchange resin containing primary or secondary amino groups, or both.

BACKGROUND

In the separation of N,N-dimethylacetamide (DMAC) and acetic acid, the resulting DMAC may be found unsuitable as a solvent medium for polymer-forming reactions. Investigation has revealed that this is due to the presence of acetic anhydride, which reacts with amino and hydroxyl groups; these functional groups are often reactants in polymer-forming systems. Consequently, it is important to be able to remove acetic anhydride from DMAC.

SUMMARY OF THE INVENTION

It has now been discovered that dimethylacetamide (DMAC) can be treated with a basic ion exchange resin containing primary or secondary amino groups, or both, to remove acetic anhydride therefrom. The DMAC recovered therefrom is useful as a solvent for polymer-forming reactions without interfering with the desired polymerization. The DMAC product is considered free from acetic anhydride when but traces, if any, of the anhydride are detected in the treated DMAC by conventional gas chromatographic analysis.

The process of purifying DMAC can be carried out as either a batch or a continuous process. In a batch process, the contaminated DMAC is stirred with the ion exchange resin, following which the resin is removed and the recovered DMAC is ready for use. It is generally more efficient and convenient to practice the invention as a continuous process wherein the contaminated DMAC is passed through a column of the ion exchange resin, the effluent DMAC being in condition for use. In both batch and continuous operations special conditions of temperature or pressure are not necessary and ambient conditions are used.

The ion exchange resin employed in the present invention is a weakly basic anionic exchange resin. It is essential that the resin be insoluble in DMAC and that it contain primary or secondary amino groups, or both. The amino content of the resin can vary widely. The capacity of the commercially available resins of this type generally is in the range of 1 to 10 milliequivalents per gram of resin. Of course resins with a greater or lesser capacity could as well be used.

Aside from the required amino groups and the insolubility in DMAC, the other chemical characteristics of the resins employed are immaterial for purposes of this invention. A wide variety of suitable resins are known and described in the literature. For example reference can be made to Helfferich, "Ion Exchange," 1962, McGraw-Hill, pp. 47 to 58. The description and synthesis of particularly suitable types of ion exchange resins for this invention can be found in that text and in U.S. Pats. 2,591,574, 2,629,710 and 2,933,460, which are hereby incorporated herein by reference. Dowex 3, (Dow Chemical) a polyamine type made from styrene/divinylbenzene copolymers, and Amberlite IR–45 (Rohm and Haas) a polystyrene-polyamine type, are representative of the commercially available weakly basic ion exchange resins that can be used.

The DMAC to be treated in accord with the present discovery generally contains 5 to 300 parts of acetic anhydride per million (p.p.m.) of the DMAC and a few thousand p.p.m., i.e., 5000 p.p.m., of acetic acid; as is evident, DMAC with greater or lesser amounts of these materials also can be treated For satisfactory operations, the water content of the DMAC solution and of the ion exchange resin is kept low, i.e. below 1% by weight or even below 0.25%.

In the process, the acetic anhydride in the DMAC reacts with the amino groups of the ion exchange resin to form amide groups. One molecule of acetic acid is released during the amidation reaction. Although one might expect the released molecule of acetic acid to react with another amino group of the ion exchange resin with formation of an acetate salt, this is not always found to be true in practice; that is, the effluent DMAC may contain small amounts of acetic acid, and in those cases where the initial DMAC already contains a small amount of acetic acid, the acetic acid content of the effluent DMAC may be slightly greater. That this occurs may be due to the fact that DMAC itself is a weakly basic compound. However, the presence of acetic acid in the effluent DMAC is not deleterious for many purposes, for it is found that acetic acid is harmless in many polymer forming systems, whereas acetic anhydride is harmful and cannot be tolerated.

The invention will be described further in conjunction with the following examples.

Example 1

Dowex 3, a weak base ion exchange resin containing primary and secondary amino groups (Dow Chemical Co.) was placed in a 1-inch diameter glass tube to a bed length of 20 inches. DMAC, which had been dried over molecular sieves, was passed through the column slowly to remove any water occluded in the resin. Thereafter a mixture containing 495 grams of DMAC, 2.5 grams of acetic acid and 0.25 gram of acetic anhydride was slowly passed through the column. After discarding the first 125 grams of effluent (this approximates the amount of liquid held up in the packed column), two samples were collected and these samples were analyzed by gas chromatography. The first sample, 150 grams, contained 0.40% acetic acid but was free of acetic anhydride. The next sample, 135 grams, contained 0.53% acetic acid and only a trace of acetic anhydride. The run was continued until more than 1500 grams of DMAC had been passed through the column, all of which was substantially free of acetic anhydride.

Example 2

Using the same column as employed in Example 1, which had not yet been regenerated, a mixture of 700 grams of DMAC containing, by weight, 0.5% of acetic acid and 0.4% of acetic anhydride was passed through the column. The effluent recovered contained only traces of acetic anhydride as indicated by gas chromatographic analysis.

Example 3

A sample of Dowex 3 ion exchange resin was dehydrated by soaking in previously dried DMAC (dried over molecular sieves) for 20 hours, followed by a second soaking in another quantity of dry DMAC. The conditioned ion exchange resin was placed in a 1-inch glass tube to a length of 20 inches. A 500-ml. sample of DMAC containing about 0.5% of acetic acid and detectable traces of acetic anhydride was slowly passed through the column.

The water content of the sample was 0.03%. By gas chromatographic analysis the effluent from the column contained no detectable acetic anhydride, and the water content was low enough for this solvent to be used as the medium for a polymerization reaction employing a tetracarboxylic dianhydride.

In a similar run, the recovered effluent was successfully used as the solvent medium for a polymerization reaction between a diamine and a tetracarboxylic dianhydride. From the foregoing description, discussion and data, it is apparent that the present discovery is a simple method to remove acetic anhydride from DMAC. The process is fast, efficient and inexpensive. While it has been described with reference to certain detail, it will be apparent that changes therein can be made without departing from its scope.

What is claimed is:

1. Process for removing acetic anhydride from its admixture with dimethylacetamide (DMAC) comprising treating a solution of acetic anhydride in DMAC with a weakly basic ion exchange resin insoluble in said DMAC and containing basic groups from the class consisting of primary amino groups, secondary amino groups and mixtures thereof, and recovering DMAC free from acetic anhydride from said basic ion exchange resin.

2. The process of claim 1 wherein the mixture of acetic anhydride and DMAC is characterized by 5 to 300 parts per million of acetic anhydride.

3. The process of claim 2 wherein the water content of said mixture of acetic anhydride and DMAC is less than about 1% by weight, based upon the total weight of said mixture.

References Cited

UNITED STATES PATENTS

| 3,324,107 | 6/1967 | Andrews et al. | 260—561 |
| 2,942,027 | 6/1960 | Hewett et al. | 260—561 |

ALEX MAZEL, Primary Examiner

J. A. NARCAVAGE, Assistant Examiner

U.S. Cl. X.R.
260—546, 701